United States Patent
Xu et al.

(10) Patent No.: US 12,505,140 B2
(45) Date of Patent: Dec. 23, 2025

(54) INFORMATION INTERACTION VIA A MULTIMEDIA CONFERENCE

(71) Applicant: Beijing Bytedance Network Technology Co., Ltd., Beijing (CN)

(72) Inventors: Qianyi Xu, Beijing (CN); Shuhan Lu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/513,368

(22) Filed: Nov. 17, 2023

(65) Prior Publication Data
US 2024/0086443 A1    Mar. 14, 2024

Related U.S. Application Data

(63) Continuation of application No. PCT/CN2022/093337, filed on May 17, 2022.

(30) Foreign Application Priority Data

May 18, 2021   (CN) .......................... 202110543159.8

(51) Int. Cl.
| | | |
|---|---|---|
| *G06F 16/34* | (2025.01) | |
| *G06F 3/048* | (2013.01) | |

(Continued)

(52) U.S. Cl.
CPC .............. *G06F 16/34* (2019.01); *G06F 3/048* (2013.01); *G06Q 10/1053* (2013.01); *H04M 3/567* (2013.01); *G06F 2203/04803* (2013.01)

(58) Field of Classification Search
CPC ..... G06Q 10/1053; H04M 3/567; H04N 7/15; H04N 7/141; G06F 16/34; G06F 3/048; G06F 2203/04803
See application file for complete search history.

(56) References Cited

U.S. PATENT DOCUMENTS

| | | | |
|---|---|---|---|
| 6,785,679 B1 * | 8/2004 | Dane ...................... | G06Q 10/10 707/999.009 |
| 6,873,964 B1 | 3/2005 | Williams et al. | |

(Continued)

FOREIGN PATENT DOCUMENTS

| | | |
|---|---|---|
| CN | 105426082 A | 3/2016 |
| CN | 106454198 A | 2/2017 |

(Continued)

OTHER PUBLICATIONS

International Search Report in PCT/CN2022/093337, mailed Jul. 27, 2022, 5 pages.

(Continued)

*Primary Examiner* — Patrick F Riegler
(74) *Attorney, Agent, or Firm* — Astute IP Law Group

(57) ABSTRACT

Embodiments of the present disclosure provide an information interaction method and apparatus, system and electronic device. The method comprises: receiving an interview instruction issued by a user to enter a preset interview; sending an interview request generated according to the interview instruction to a multimedia conferencing server to instruct the multimedia conferencing server to connect a terminal device to a predetermined web conference room, and determining a user identity of the user according to user information indicated by the interview request; in response to the user identity of the user being determined to be an interviewer, receiving first interview information that matches the interviewer identity as returned by the multimedia conferencing server; displaying a resume indicated by the resume information in a multimedia conferencing client of the terminal device. Thus, it is possible to view the resume of the candidate while holding an interview by means of multimedia conferencing.

19 Claims, 6 Drawing Sheets

(51) Int. Cl.
*G06Q 10/1053* (2023.01)
*H04M 3/56* (2006.01)

(56) References Cited

U.S. PATENT DOCUMENTS

| | | | |
|---|---|---|---|
| 10,320,725 B1* | 6/2019 | Li | H04N 7/141 |
| 2003/0120531 A1* | 6/2003 | Parker | G06Q 10/063112 705/7.14 |
| 2004/0039618 A1* | 2/2004 | Cardenas-Vasquez | G06Q 10/1053 705/321 |
| 2007/0088601 A1 | 4/2007 | Money et al. | |
| 2007/0265865 A1* | 11/2007 | Cox | G06Q 10/1053 705/321 |
| 2008/0162569 A1 | 7/2008 | Schifone | |
| 2009/0228323 A1 | 9/2009 | Ebrahimian | |
| 2010/0241581 A1* | 9/2010 | Duraiswamy | G06Q 10/10 705/321 |
| 2012/0082226 A1* | 4/2012 | Weber | H04N 7/141 375/E7.246 |
| 2013/0054636 A1* | 2/2013 | Tang | G06F 40/169 707/769 |
| 2013/0332381 A1 | 12/2013 | Clark et al. | |
| 2014/0122152 A1* | 5/2014 | Lee | G06Q 10/1053 705/7.19 |
| 2014/0156550 A1* | 6/2014 | Olivier | G06Q 10/1053 705/321 |
| 2014/0184850 A1* | 7/2014 | Raju | H04N 7/147 348/239 |
| 2015/0347976 A1* | 12/2015 | Munzer | G06Q 10/1053 705/321 |
| 2016/0224942 A1* | 8/2016 | Chavan | G06Q 10/105 |
| 2018/0165650 A1* | 6/2018 | Kashyape | H04N 7/155 |
| 2018/0316642 A1* | 11/2018 | Shabtai | G06Q 10/1053 |
| 2019/0164107 A1* | 5/2019 | Upadhyay | G06Q 10/06398 |
| 2020/0143329 A1* | 5/2020 | Gamaliel | H04N 21/45455 |
| 2020/0177642 A1* | 6/2020 | Bai | H04M 3/42042 |
| 2020/0184423 A1* | 6/2020 | McEnroe | G06N 20/20 |
| 2020/0272995 A1* | 8/2020 | Duval-Igarta | G06Q 10/063114 |
| 2021/0097496 A1* | 4/2021 | Chen | G06F 3/0488 |
| 2021/0158302 A1* | 5/2021 | Dangi | G06Q 50/265 |
| 2022/0044205 A1* | 2/2022 | Demidovich | G06Q 10/1053 |
| 2022/0172147 A1* | 6/2022 | Jose | G06Q 10/1053 |
| 2022/0414604 A1* | 12/2022 | Bleacher | G06F 9/451 |
| 2023/0214778 A1* | 7/2023 | McMahon | G06F 18/2178 |
| 2024/0005282 A1* | 1/2024 | Kuwahara | G06Q 10/1053 |

FOREIGN PATENT DOCUMENTS

| | | |
|---|---|---|
| CN | 106572084 A | 4/2017 |
| CN | 109102254 A | 12/2018 |
| CN | 109391476 A | 2/2019 |
| CN | 305297030 S | 8/2019 |
| CN | 110689318 A | 1/2020 |
| CN | 110876033 A | 3/2020 |
| CN | 112312223 A | 2/2021 |
| CN | 306541811 S | 5/2021 |
| CN | 113222549 A | 8/2021 |
| JP | 2013210981 A | 10/2013 |
| JP | 2015211316 A | 11/2015 |
| JP | 2018041249 A | 3/2018 |
| JP | 2018181257 A | 11/2018 |
| JP | 2019101855 A | 6/2019 |
| KR | 101998753 B1 | 7/2019 |

OTHER PUBLICATIONS

Office Action in CN202110543159.8, mailed Dec. 2, 2022, 13 pages.
Office Action in CN202110543159.8, mailed Feb. 28, 2023, 13 pages.
Notice of Reasons for Refusal for Japanese Patent Application No. 2023-571355, mailed on Oct. 8, 2024, 9 pages.
Written Opinion for International Application No. PCT/CN2022/093337, mailed on Jul. 27, 2022, 12 Pages.
Decision of Refusal for Japanese Patent Application No. 2023-571355, mailed on Jan. 21, 2025, 4 pages.

* cited by examiner

INFORMATION INTERACTION VIA A MULTIMEDIA CONFERENCE

CROSS-REFERENCE TO RELATED APPLICATION(S)

This application is a Continuation Application of International Patent Application No. PCT/CN2022/093337, filed May 17, 2022, which claims priority to Chinese Application No. 202110543159.8 filed May 18, 2021, the disclosures of which are incorporated herein by reference in their entities.

FIELD

The present disclosure relates to the technical field of the Internet, and in particular, to an information interaction method and apparatus, a system and an electronic device.

BACKGROUND

With the development of Internet technology, users utilize the Internet for information communication at growing speed.

Interviews are an essential link in enterprise talent recruitment. In traditional interviews, interviewers usually take face-to-face conversations as the main means to assess whether the knowledge, ability and experience of candidates matches enterprise positions.

SUMMARY

This Summary is provided to introduce concepts in a simplified form that are further described below in the Detailed Description. This Summary is not intended to identify key features or essential features of the technical solution as defined, nor is it intended to be used to limit the scope thereof.

The present disclosure provides an information interaction method and apparatus, system and electronic device.

In a first aspect, an embodiment of the present disclosure provides an information interaction method, comprising: receiving an interview instruction issued by a user to enter a preset interview; sending an interview request generated according to the interview instruction to a multimedia conferencing server to instruct the multimedia conferencing server to connect the terminal device to a predetermined web conference room, and determining a user identity of the user according to user information indicated by the interview request; wherein the user identity comprises an interviewer or a candidate; in response to the user identity of the user being determined to be an interviewer, receiving first interview information that matches the interviewer identity as returned by the multimedia conferencing server, wherein the first interview information comprises resume information of a candidate; displaying a resume indicated by the resume information in a multimedia conferencing client of the terminal device.

In a second aspect, an embodiment of the present disclosure provides an information interaction method, comprising: receiving an interview request sent by a terminal device, the interview request comprising user information of a user sending the interview request, and information of a predetermined web conference room; connecting the terminal device to a web conference room indicated by the information of a web conference room and determining a user identity of the user according to the user information, the user identity comprising an interviewer or a candidate; in response to the user identity of the user being determined to be an interviewer, sending first interview information corresponding to the interviewer to the terminal device, the first interview information comprising resume information of a candidate, to instruct the terminal device to display a resume indicated by the resume information in a multimedia conferencing client.

In a third aspect, an embodiment of the present disclosure further provides an information interaction apparatus, comprising: a first receiving unit, used to receive an interview instruction issued by a user to enter a preset interview; a first sending unit, used to send an interview request generated according to the interview instruction to a multimedia conferencing server to instruct the multimedia conferencing server to connect the terminal device to a predetermined web conference room, and determine a user identity of the user according to user information indicated by the interview request; wherein the user identity comprises an interviewer or a candidate; a second sending unit, used to, in response to the user identity of the user being determined to be an interviewer, receive first interview information that matches the interviewer identity as returned by the multimedia conferencing server, wherein the first interview information comprises resume information of a candidate; a display unit, used to display a resume indicated by the resume information in a multimedia conferencing client of the terminal device.

In a fourth aspect, an embodiment of the present disclosure provides an information interaction apparatus, applied to a multimedia conferencing server, comprising: a third receiving unit, used to receive an interview request sent by a terminal device, the interview request comprising user information of a user sending the interview request, and information of a predetermined web conference room; a connecting unit, used to connect the terminal device to a web conference room indicated by the information of a web conference room and determine a user identity of the user according to the user information, the user identity comprising an interviewer or a candidate; a second sending unit, used to, in response to the user identity of the user being determined to be an interviewer, send first interview information corresponding to the interviewer to the terminal device, the first interview information comprising resume information of a candidate, to instruct the terminal device to display a resume indicated by the resume information in a multimedia conferencing client.

In a fifth aspect, an embodiment of the present disclosure provides an information interaction system, comprising: a first client of an interviewer, a second client of a candidate, a recruitment application server and a multimedia conferencing server; wherein the recruitment application server is configured to: according to a received interview appointment request, send a web conference room reservation request to the multimedia conferencing server, wherein the interview appointment request and the web conference room reservation request each comprise interviewer information, candidate information and interview time; receive web conference room information returned by the multimedia conferencing server according to the web conference room reservation request, generate a first link according to the web conference room information and send the first link to the interviewer and the candidate; the multimedia conferencing server is configured to: determine a web conference room according to the received conference room reservation request sent by the recruitment application server, and send the web conference room information to the recruitment application server; receive an interview request sent by the first client and the second client according to the first link, connect the first client and the second client to the web conference room, and determine a user identity of a user to be an interviewer or a candidate according to user information indicated by the interview request; send first interview information that matches the interviewer identity to the first client, the first interview information comprising first interview multimedia information and resume information of a candidate; and send second interview information to the second client, the second interview information comprising second interview multimedia information; the first client is configured to: send an interview request to the multimedia conferencing server according to the first link, and receive the first interview information that matches the interviewer identity as returned by the multimedia conferencing server; display a resume indicated by the resume information in a multimedia conferencing client; the second client is configured to: send an interview request to the multimedia conferencing server according to the first link, and receive the second interview information that matches the candidate identity as returned by the multimedia conferencing server; display the second interview multimedia information in a multimedia conferencing client.

In a sixth aspect, an embodiment of the present disclosure further provides an electronic device, comprising: one or more processors; a storage unit storing one or more programs, the one or more computer programs, when executed by the one or more processors, causing the one or more processors to perform an information interaction method according to the first aspect or the second aspect.

In a seventh aspect, an embodiment of the present disclosure further provides a computer readable medium, on which a computer program is stored, the program, when executed by a processor, performing an information interaction method according to the first aspect or the second aspect.

With the information interaction method, apparatus, system and electronic device provided by the embodiments of the present disclosure, an interview instruction issued by a user to enter a preset interview is received; an interview request generated according to the interview instruction is sent to a multimedia conferencing server to instruct the multimedia conferencing server to connect the terminal device to a predetermined web conference room and determine user identity of the user according to user information indicated by the interview request, wherein the user identity comprises an interviewer or a candidate; in response to the user identity of the user being an interviewer, first interview information matching the interviewer identity as returned by the multimedia conferencing server is received, wherein the first interview information comprises resume information of a candidate; a resume indicated by the resume information is displayed at a multimedia conferencing client. Thereby, it is possible to view the resume of the candidate by means of multimedia conferencing and reduce the operation of switching between interview multimedia information and the candidate resume for the interviewer.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn scale.

DETAILED DESCRIPTION OF EMBODIMENTS

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method embodiments of the present disclosure may be performed in a different order and/or in parallel. In addition, the method implementations may comprise an additional step and/or omit a step which is shown. The scope of the present disclosure is not limited in this regard.

The term "comprise" and its variants used here are to be read as open terms that mean "include, but is not limited to." The term "based on" is to be read as "based at least in part on." The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

Names of messages or information interacted between multiple apparatuses in the implementation of the present disclosure are merely for the illustration purpose, rather than limiting the scope of these messages or information.

Figure 1:
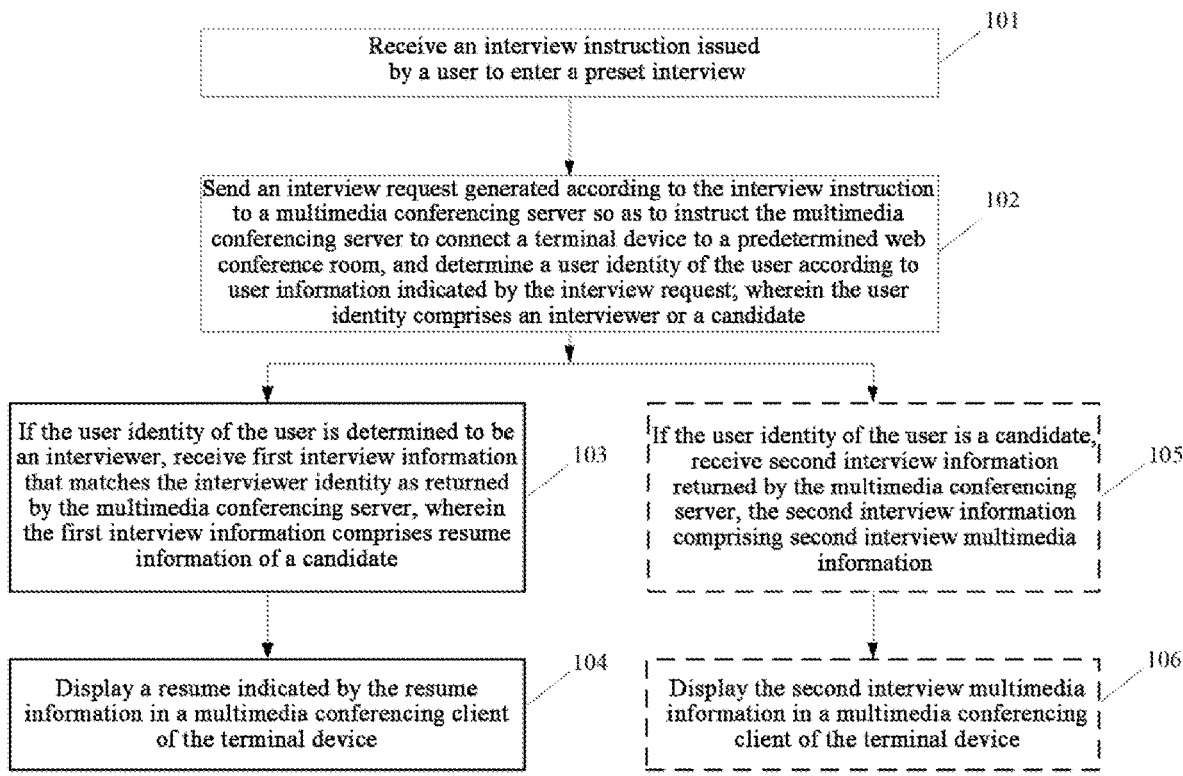
FIG. 1 is a flowchart of an embodiment of an information interaction method according to the present disclosure.

With reference to FIG. 1, this figure shows the flow of an embodiment of an information interaction method according to the present disclosure. The information interaction method is applied to a terminal device. As depicted, the information interaction method comprises the following steps:

S101: receiving an interview instruction issued by a user to enter a preset interview.

The user may be an enterprise interviewer or a candidate. Accordingly, the terminal device may be a terminal device used by an interviewer or one used by a candidate.

The terminal device mentioned here may be a user handheld mobile terminal, a desktop computer or a multimedia conferencing terminal device.

In this embodiment, the interview may be a scheduled interview. At the time of appointment, a interviewer and candidate corresponding to this interview may be specified. The number of interviewers here may be greater than or equal to 1.

The interviewer and candidate may issue an interview instruction to a terminal device to enter the scheduled interview in various ways.

In some application scenarios, the user may input an address of a web conference room corresponding to the interview to the terminal device, thus issuing the interview instruction to the terminal device to enter the interview.

In some application scenarios, a first link to enter the interview is stored in the terminal device. In such application scenarios, before step 101, the information interaction method further comprises: displaying a first link for entering an interview at a multimedia conferencing client. The first link comprises address information of a web conference room for holding interviews.

In these application scenarios, step 101 comprises: receiving the interview instruction issued by the user through a selection operation on the first link.

Specifically, the first link is determined as below:

Firstly, a recruitment application server may, for example, send a conference room reservation request to a multimedia conferencing server according to a interview appointment request received at the recruitment application client, the interview appointment request comprising interviewer information, interview time information and candidate information;

The recruitment application client may be a standalone application client running in the terminal device or a web-based application client embedded to run in the browser.

An enterprise recruiter may initially screen candidates from multiple candidate resumes based on the position vacant. Further, the enterprise recruiter may schedule an interview. In scheduling the interview, an interviewer may be determined in advance based on the position vacant, and an interview time may be determined.

After determining the interviewer, the enterprise recruiter may send an interview appointment request through the recruitment application client to the recruitment application server. The interview appointment request may comprise information of the interviewer, information of the candidates and the interview time.

The recruitment application server may receive the interview appointment request sent by the recruitment application client.

Secondly, the multimedia conferencing server determines a web conference room according to the conference room reservation request and generates the first link according to a preset rule and information of the web conference room. Finally, the multimedia conferencing server sends the first link to the recruitment application server, so that the recruitment application server sends the first link to the user.

After receiving the recruitment appointment request, the recruitment application server may send a conference room reservation request to the multimedia conferencing server. Here, the multimedia conferencing server may be a server that manages multiple web conference rooms and forward multimedia conferencing information.

The conference room reservation request may also comprise the information of the interviewer, the information of the candidates and the interview time.

The multimedia conferencing server may determine a web conference room corresponding to this interview according to the conference room reservation request.

After determining the web conference room for this interview, the multimedia conferencing server may generate a first link according to a preset rule and information of the web conference room. Here, the information of the web conference room may comprise network address information of the web conference room and/or identification information of the web conference room.

The multimedia conferencing server may send the generated first link to the recruitment application server. Then, the recruitment application server sends the first link to the user.

Step 102: sending an interview request generated according to the interview instruction to the multimedia conferencing server to instruct the multimedia conferencing server to connect the terminal device to the pre-determined web conference room and to determine a user identity of the user according to user information indicated by the interview request; wherein the user identity comprises an interviewer or a candidate.

In some application scenarios, the interview request may comprise address information of the web conference room and the user information.

The multimedia conferencing server may connect the terminal device to the web conference room corresponding to the interview according to the address information. In practice, connecting the terminal device to the web conference room may refer to the server establishing a communication connection with the terminal device.

While the multimedia conferencing server connects the terminal device to the web conference room corresponding to the interview according to the address information, the user identity of the user may be determined according to the user information. Here, the user information is configured to identify difference users.

The multimedia conferencing server may store in advance information of the interviewer and information of the candidate corresponding to this interview. Here, the information of an interviewer and the information of a candidate may include, but not limited to, user identity information of the user logging into the multimedia conferencing client.

The multimedia conferencing server may match the user information of the user with the pre-stored interviewer information; if there is a match, then the user identity of the user is determined to be the interviewer. If there is no match, the multimedia conferencing server may further match the user information of the user with the pre-stored candidate information; and if there is a match, then the user identity of the user is determined to be the candidate. If there is no match, then the multimedia conferencing server return an exception message to indicate that the user information is abnormal.

In other application scenarios, the interview request may be generated according to a first link clicked on by the user to enter the preset interview. The first link may comprise the address information of the web conference room and further the user identity information of the user.

In such application scenarios, the multimedia conferencing server may connect the terminal device to the web conference room according to the address information of the web conference room.

The multimedia conferencing server may confirm the user identity information sent by the first link, for example, obtain the user information of the user through the terminal device, match the user information with the pre-stored interviewer information and candidate information of this interview, and confirm the user identity of the user according to a match result.

Step 103: if the user identity of the user is the interviewer, then receiving first interview information matching the interviewer identity as returned by the multimedia conferencing server, wherein the first interview information comprises resume information of a candidate.

If the multimedia conferencing server determines that the user identity of the user sending the interview request is the interviewer, then first interview information matching the interviewer identity may be sent to a terminal device used by the user. The first interview information comprises resume information of a candidate.

In addition, the first interview information further comprises first interview multimedia information. The first interview multimedia information comprises: an audio data stream and/or a video data stream, page information for displaying the audio data stream and/or the video data stream. The page information for displaying the audio data stream and/or the video data stream comprises control information corresponding to the authority of the interviewer.

Step 104: displaying a resume indicated by the resume information at a multimedia conferencing client of the terminal device.

In this embodiment, upon receiving the first interview information, the terminal device may transmit the first interview information to a multimedia conferencing client running thereon. The multimedia conferencing client may display a resume indicated by the resume information.

In some application scenarios, step 104 comprises displaying a resume indicated by the resume information while displaying interview multimedia information at a multimedia client.

In some application scenarios, the resume information of the candidate may comprise a network storage address of a resume of the candidate. The resume of the candidate may be an electronic resume.

In these application scenarios, before step 104, the information interaction method further comprises the step of: obtaining the resume of the candidate based on the network storage address.

In some application scenarios, a page of the multimedia conferencing client may be divided into a first area and a second area, wherein the first area displays the interview multimedia information, and the second area displays the resume of the candidate.

The information interaction method provided by this embodiment receives an interview instruction issued by a user to enter a preset interview; sends an interview request generated according to the interview instruction to a multimedia conferencing server to instruct the multimedia conferencing server to connect the terminal device to a predetermined web conference room and determine user identity of the user according to user information indicated by the interview request, wherein the user identity comprises an interviewer or a candidate; if the user identity of the user is an interviewer, receives first interview information matching the interviewer identity as returned by the multimedia conferencing server, wherein the first interview information comprises resume information of a candidate; displays a resume indicated by the resume information at a multimedia conferencing client. Thereby, it is possible to view the resume of the candidate while holding an interview by means of multimedia conferencing.

In the related art, when interview video content and a candidate resume are displayed in different windows, the interviewer has to keep switching between the window displaying the interview video content and the window displaying the candidate resume when holding the interview. With the solution provided by this embodiment, the interview may further display the candidate resume in the window of the multimedia conferencing client, so that the user operation of switching between different windows is reduced.

Figure 2:
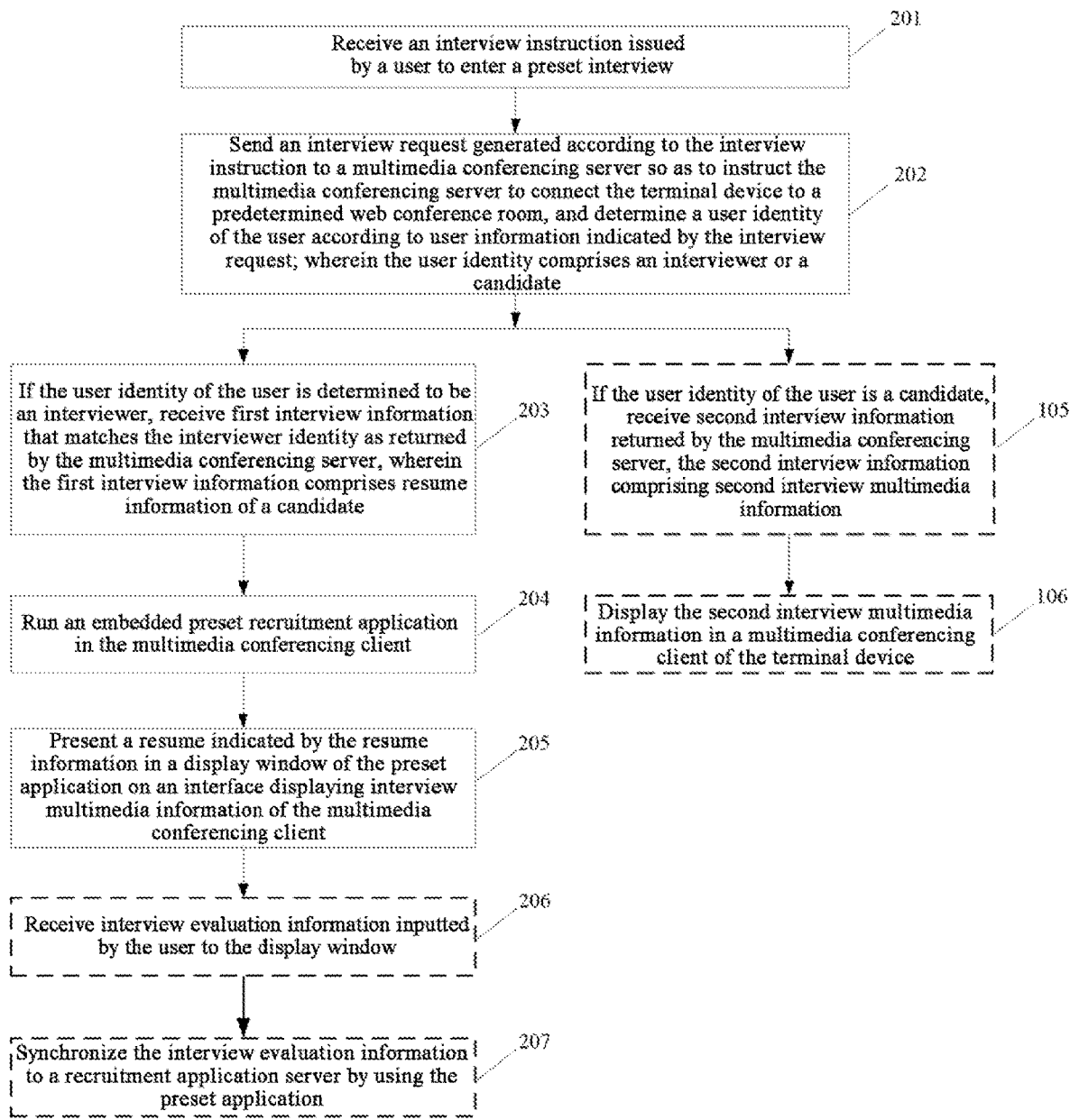
FIG. 2 is a flowchart of a further embodiment of an information interaction method according to the present disclosure.

With reference to FIG. 2 next, this figure shows the flow of an embodiment of an information interaction method according to the present disclosure. The information interaction method is applied to a terminal device. As depicted, the information interaction method comprises the following steps:

Step 201: receiving an interview instruction issued by a user to enter a preset interview.

Step 202: sending an interview request generated according to the interview instruction to a multimedia conferencing server to instruct the multimedia conferencing server to connect the terminal device to a predetermined web conference room and determine a user identity of the user according to user information indicated by the interview request; wherein the user identity comprises an interviewer or a candidate.

Step 203: if the user identity of the user is an interviewer, receiving first interview information matching the interviewer identity as returned by the multimedia conferencing server, wherein the first interview information comprises resume information of a candidate.

In this embodiment, steps 201~203 may be same as or similar to steps 101~103 of the embodiment shown in FIG. 1.

Step 204: running, in the multimedia conferencing client, a preset application embedded in the multimedia conferencing client for displaying job applicant information.

Step 205: presenting a resume indicated by the resume information in a resume display window of the preset application.

In this embodiment, a preset application may be embedded in the multimedia conferencing client. Here, the preset application may be, for example, an embedded browser, an applet, etc.

In some application scenarios, the resume information of the candidate may comprise a network storage address where an electronic resume of a candidate is stored.

In these application scenarios, before step 205, the information interaction method further comprises the step of: obtaining the resume of the candidate based on the network storage address.

In some application scenarios, a page of the multimedia conferencing client may be divided into a first area and a second area. The first area displays the interview multimedia information, and the second area displays the resume of the candidate.

In some application scenarios, the preset application may be a web-based recruitment application embedded in a web page.

In these application scenarios, an embedded browser may run in the multimedia conferencing client. The preset application is opened in the browser.

A display window of the preset recruitment application may be displayed above a display interface of the interview multimedia information. The size of the display window of the preset application may be smaller than the size of the display interface of the interview multimedia information.

Thus, the interviewer may browse the resume of the candidate when conducting the interview using the multimedia conferencing client.

In some optional implementations, the first interview information further comprises first interview multimedia information. The displaying a resume indicated by the resume information at a multimedia conferencing client of the terminal device comprises:

in response to receiving a switch instruction for indicating switch to a second display window when a first display window is displayed at a multimedia conferencing client, switching the first display window to the second display window according to the switch instruction.

The first display window is a resume display window of a preset application for displaying resumes, and the second display window is a first multimedia stream display window for displaying the first interview multimedia information. Or the first display window is the first multimedia stream display window, and the second display window is the resume display window.

In these application scenarios, the first interview multimedia information and the resume are displayed in different windows. A switch control may be set in either of the two windows to switch to the other window. The interviewer may switch to the other window by clicking, touching or other simple operations on the switch control in either window. Thus, it is convenient for the interviewer to browse the interview information and the resume information of the candidate.

In other optional implementations, the first interview information further comprises first interview multimedia information. The displaying a resume indicated by the resume information at a multimedia conferencing client comprises: simultaneously displaying a first multimedia stream display window for displaying first interview multimedia information and a resume display window for displaying a resume in the multimedia conferencing client.

In these optional implementations, the first multimedia stream display window and the resume display window are simultaneously displayed in the multimedia conferencing client, so that the interviewer may simultaneously browse the first interview multimedia information and the resume of an interviewee. It is further convenient for the interviewer to know about the resume information of the interviewee when the interviewer communicates with the interviewee through audio/video information.

Further optionally, the first multimedia stream display window is displayed above the resume display window. In such optional implementations, the first multimedia stream window may be displayed as a popup or floating window above the resume display window, so that both the first multimedia stream window and the resume display window may be displayed at the same time in the multimedia conferencing client.

In some application scenarios, the size of the first multimedia stream display window is larger than that of the resume display window. In these application scenarios, the first multimedia stream window is set to be smaller than the resume display window, so that the interviewer may clearly browse resumes.

In some optional implementations, the size of the first multimedia stream display window and that of the resume display window are adjusted based on a display size adjustment operation of the user.

In these optional implementations, the size of the first multimedia stream display window and the size of the resume display window may be adjusted through a display size adjustment operation. For example, by clicking on or touching a border or vertex of the first multimedia stream display window, a drag-and-drop operation is performed to resize the display size of the first multimedia stream display window. Or, by clicking on or touching a border or vertex of the resume display window, a drag-and-drop operation is performed to resize the display size of the resume display window. By resizing the first multimedia stream display window and/or the resume display window, it is possible for the interviewer to set the first multimedia stream display window and the resume window that meet needs.

In other optional implementations, the information interaction method further comprises: in response to receiving an area switch operation on a display area of the resume display window and/or a display area of the first multimedia stream display window, switching the display area of the resume display window and/or the first multimedia stream display window according to the area switch operation.

The switch operation may comprise, for example, dragging, clicking, double-clicking and the like. Through the area switch operation, it is possible to adjust the display area of the first multimedia stream display window and the display area of the resume display window.

In some application scenarios, an area interaction control may be set in the first multimedia stream display window and the resume display window respectively. After the interviewer clicks on the area interaction control in either of the windows, the display regions of the first multimedia stream display window and the resume display window may be exchanged.

In these application scenarios, layers of the first multimedia stream display window may be interacted with according to a triggering action of the area interaction control. As an example, the first multimedia stream display window is displayed as a floating window before the area interaction control is triggered, and after the interviewer performs a trigger operation on the area interaction control, the first interview multimedia information may be displayed in the floating window, and the resume may be displayed in a lower window of the floating window.

In some optional implementations, before step 205, the information interaction method further comprises the step of:

receiving authorization information sent by the recruitment application server to present a resume, wherein the authorization information is sent by the recruitment application server in response to the user identity of a user logging in through the preset application being an interviewer.

In these optional implementations, the preset application embedded in the multimedia conferencing client may obtain a login account of a user for logging in to the multimedia conferencing client and determine the login account as a login account of the user for logging in to the recruitment application, and the recruitment application server may obtain the login account of the user from the preset application embedded in the multimedia conferencing client and determine a user identity of the user corresponding to the login account. When the user identity of the user corresponding to the login account is an interviewer, the authorization information for presenting a resume of a candidate may be sent to the terminal device.

Step 205 may comprise: presenting the resume in the resume display window of the preset application.

In some optional implementations, the information interaction method further comprises the step of:

in response to the user performing the switch operation on the preset switch control displayed in the multimedia conferencing client, running a display object indicated by the switch operation in the foreground, wherein the display object comprises a display window displaying the preset application, and a first multimedia stream display window displaying the first interview multimedia information.

The preset switch control may be set in the multimedia conferencing client, and when the preset application runs in the multimedia conferencing client, the switch control will not be covered by the display window of the preset application.

The user may perform a switch operation on the switch control to run a current display object indicated by the switch operation in the foreground. That is, when interview multimedia information is displayed in the multimedia conferencing client, the display window of the preset application may be displayed above a display interface displaying the interview multimedia information. When the user clicks on the switch control, the display interface displaying the first interview multimedia information may be displayed (only displayed) in the foreground. When displaying (only displaying) the display interface of the first interview multimedia information in the foreground, the switch control may be clicked on, so that the display window displaying the preset application is displayed above the display interface displaying the first interview multimedia information.

In these optional implementations, by setting the switch control in the multimedia conferencing client, the free switch between the display interface showing the first interview multimedia information and a display window showing a photo application may be realized, so that convenience is provided for the interviewer to switch between the display interface and the display window in the multimedia conferencing client.

Step 206: receiving interview evaluation information inputted by the user in the display window.

The user is an interviewer. The interviewer may input interview evaluation information to the display window of the preset recruitment application which displays the resume.

In some application scenarios, an information input window for inputting interview evaluation information may be provided in the display window. The user may input the interview evaluation information through the information input window.

Step 207: synchronizing the interview evaluation information to a recruitment application server by using the preset recruitment application.

The terminal device may synchronize the interview evaluation information to a recruitment information server by using the preset application, so that the interview evaluation information may be saved in the recruitment application server.

Compared with the embodiment shown in FIG. 1, this embodiment highlights the steps of displaying a candidate resume by using the embedded preset recruitment application running in the multimedia conferencing client, receiving interview evaluation information inputted by the user in the recruitment application display window, and uploading the interview evaluation information to a recruitment application server by using the recruitment application, so that the interviewer may browse the candidate resume without switching the window and input the interview evaluation information in the window displaying the resume when conducting an interview by using the multimedia conferencing client. On the one hand, the operation of switching between different windows to browse the first interview multimedia information, view the candidate resume and write the interview evaluation information is reduced, and on the other hand, the interview evaluation information is fed back from the recruitment application to the recruitment application server, so that the recruitment application server may make statistics on the interview information.

In some optional implementations of various embodiments of the information interaction method of the present disclosure, the information interaction method of the embodiments shown in FIGS. 1 and 2 may further comprise the following steps:

firstly, receiving a preset operation performed by the user on an interview evaluation control for instructing to write an interview evaluation when finishing the interview, closing the multimedia conferencing client and invoking a browser to open the address of the resume;

secondly, displaying an interview evaluation information input window by using a browser;

lastly, receiving interview evaluation information inputted by the user to the evaluation information input window and sending the interview evaluation information to the recruitment application server.

In some application scenarios, the interview evaluation control may be presented in the display interface of the multimedia conferencing client which displays the interview multimedia information. In these application scenarios, the user may click on the interview evaluation control when finishing this interview. For example, the user may click on the interview evaluation control before performing a preset operation on an interview finish control or a multimedia conferencing client close control in order to finish the interview.

In other application scenarios, the interview evaluation control may be presented as a floating or popup window when the user performs the preset operation on the interview finish control or the multimedia conferencing client close control to finish the interview.

After the user performs the preset operation on the interview evaluation control, the terminal device invokes a browser to open the candidate resume by using the browser while closing the multimedia conferencing client. The browser may further display an interview evaluation information input window. The interviewer may continue to input interview evaluation information of this interview to the interview evaluation information input window. The browser sends the interview evaluation information to the recruitment application server.

In these optional implementations, the interviewer may, after finishing this interview, continue to access a web-based recruitment application client through the browser to present a candidate resume in the web-based recruitment application client. The user may continue to input interview evaluation information to the web-based recruitment application client. The web-based recruitment application may send the interview evaluation input inputted by the user to a recruitment application server, so that the recruitment application server may record the interview evaluation information or make statistics on the interview evaluation information.

In some optional implementations of various embodiments of the information interaction method of the present disclosure, in the information interaction method of the embodiments shown in FIGS. 1 and 2, the display interface of the multimedia conferencing client of the interviewer comprises a preset permission control, which matches preset permissions of the interviewer.

The preset permissions may include, but not limited to, permissions to adjust the multimedia information volume level, turn on/off a camera, turn on/off a microphone, finish the interview, etc.

In a multimedia information client corresponding to the interviewer, the preset permission control may be displayed in the display interface of the multimedia information client which displays multimedia information, so that it is convenient for the interviewer to control the interview in a way corresponding to the permissions.

In some optional implementations of various embodiments of the information interaction method of the present disclosure, the information interaction method of the embodiments shown in FIGS. 1 and 2 may further comprises:

Step 105: if the user identity of the user is a candidate, receiving second interview information returned by the multimedia conferencing client, the second interview information comprising second interview multimedia information;

Step 106: displaying the second interview multimedia information in the multimedia conferencing client of the terminal device.

In these optional implementations, if the multimedia conferencing server determines the user identity of the user to be a candidate, then the second interview information may be sent only to the terminal device. The second interview information may comprise second interview multimedia information. The second interview multimedia information may comprise an audio data stream and/or video data stream.

The terminal device may display the second interview multimedia information in a multimedia conferencing client that runs thereon.

That is, if the user issuing the interview instruction to enter the preset interview through the terminal device is a candidate, the interview multimedia information of this interview may be sent only to the candidate.

In these optional implementations, by sending interview information that matches the user identity to the terminal device of the user, the differentiation of interview scenarios for interviewers and candidates is realized, and the user experience is improved.

Figure 3:
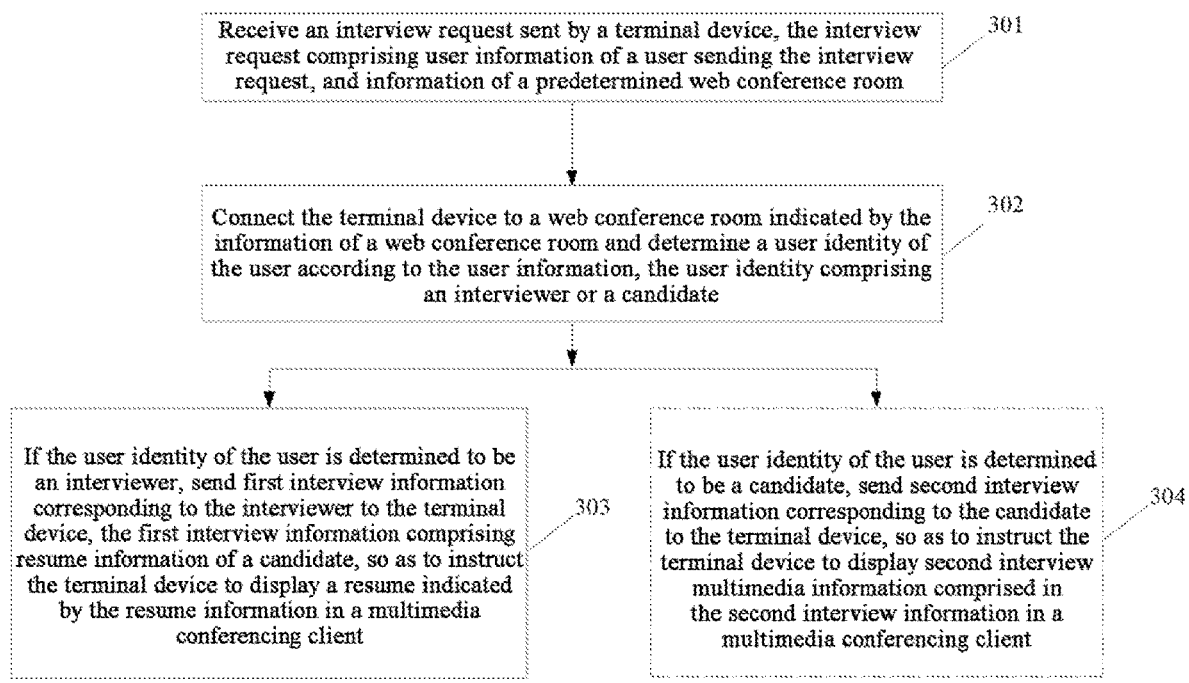
FIG. 3 is a flowchart of a still further embodiment of an information interaction method according to the present disclosure.

With reference to FIG. 3, this figure shows a flowchart of a further embodiment of an information interaction method according to the present disclosure. The information interaction method is applied to a multimedia conferencing server, comprising:

Step 301: receiving an interview request sent by a terminal device, the interview request comprising user information of a user sending the interview request, and information of a predetermined web conference room.

Here, the information of a web conference room may comprise an identifier of the web conference room, an address of the web conference room, etc. The identifier of the web conference room may comprise words, numbers and/or symbols. The identifier of the web conference room may be used to differentiate between different web conference rooms.

Step 302: connecting the terminal device to a web conference room indicated by the information of the web conference room and determining a user identity of the user according to the user information, the user identity comprising an interviewer or a candidate.

Step 303: if determining the user identity of the user to be an interviewer, sending first interview information corresponding to the interviewer to the terminal device, the first interview information comprising resume information of a candidate, to instruct the terminal device to display a resume indicated by the resume information in a multimedia conferencing client.

In some optional implementations of this embodiment, the information interaction method further comprises step 304: if the user identity of the user is a candidate, sending second interview information corresponding to the candidate to the terminal device, the second interview information comprising second interview multimedia information, to instruct the terminal device to display the second interview multimedia information in a multimedia conferencing client.

In some optional implementations, step 301 may comprise: receiving an interview request issued by the terminal device according to a selection operation performed by a user on a displayed first link, wherein the first link comprises an address of the web conference room.

In some optional implementations, before step 301, the information interaction method further comprises: receiving a conference room reservation request sent by a recruitment application server to a multimedia conferencing server according to an interview appointment request received from a recruitment application client, the interview appointment request comprising information of an interviewer, interview time information, and information of a candidate; determining a web conference room according to the conference room reservation request and generating the first link according to a preset rule and the information of the web conference room; sending the first link to the recruitment application server to cause the recruitment application server to send the first link to the user.

In some optional implementations, step 303 comprises: if determining the user identity of the user to be an interviewer, obtaining resume information of a candidate indicated by the interview request from a recruitment application server according to the interview request; sending the first interview information to the terminal device.

For a detailed illustration of each step in this embodiment, reference may be made to the illustration of relevant portions in the embodiment shown in FIG. 1 or FIG. 2, which is not detailed here.

In the information interaction method provided by this embodiment, an interview request sent by a terminal device is received, the interview request comprising user information of a user, and identification information of a predetermined web conference room; the terminal device is connected to a web conference room indicated by the identification information, and a user identity of the user is determined according to the user information; if the user identity of the user is determined to be an interviewer, first interview information corresponding to the interviewer is sent to the terminal device, the first interview information comprising resume information of a candidate, to instruct the terminal device to display a resume indicated by the resume information in a multimedia conferencing client when displaying first interview multimedia information in the multimedia conferencing client. On the one hand, by sending interview information that matches the user identity to the terminal device of the user, the differentiation of interview scenarios for interviewers and candidates is realized, and the user experience is improved. On the other hand, the operation of the interviewer switching between different windows in order to browse resumes of candidates when holding an interview by means of multimedia conferencing is reduced.

Figure 4:
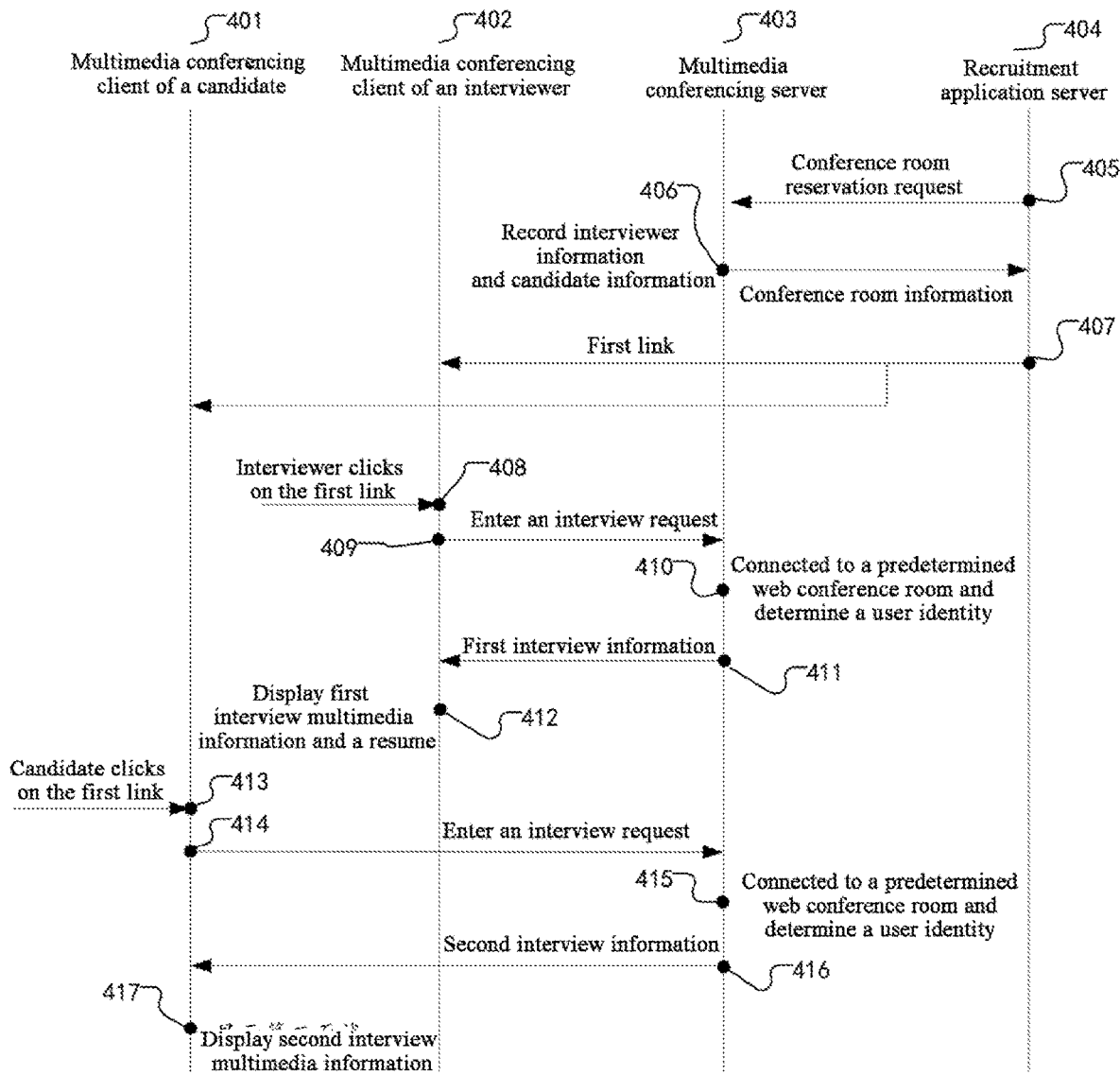
FIG. 4 is a schematic diagram of principle interaction of an information interaction method of the present disclosure.

With reference to FIG. 4, this figure shows a schematic diagram of principle interaction of an information interaction method according to the present disclosure.

As shown in FIG. 4, a recruitment application server 404 sends a web conference room reservation request 405 to a multimedia conferencing server 403 according to a received interview appointment request, wherein the interview appointment request and the web conference room reservation request both comprise interviewer information, candidate information and interview time.

The multimedia conferencing server 403 determines a web conference room for this interview according to the conference room reservation request 405 sent by the recruitment application server 404, sends conference room information 406 of the web conference room to the recruitment application server 404 and at the same time, records interviewer information and candidate information corresponding to this interview.

The recruitment application server 404 may, after receiving the conference room information 406 sent by the multimedia conferencing server 403, generate a first link 407 according to the conference room information 406 and send the first link 407 to a first terminal device and a second terminal device corresponding to the interviewer and the candidate respectively.

An interviewer multimedia conferencing client 402 runs in the first terminal device of the interviewer. After receiving the first link sent by the recruitment application server 404, the first terminal device may display the first link in the interviewer multimedia conferencing client 402. The interviewer multimedia conferencing client 402 receives a selection operation performed by the interviewer on the first link, e.g., a click operation 408. Then, the interviewer multimedia conferencing client 402 sends an interview request to enter an interview to the multimedia conferencing server 403 according to the selection operation performed by the user on the first link. The interview request 409 may comprise user information.

The multimedia conferencing server 403 connects the interviewer multimedia conferencing client 402 to a predetermined web conference room according to the received interview request 409 and determines a user identity 410 according to the user information. Here, the user identity determined according to the user information is an interviewer. The multimedia conferencing client 403 may send first interview information 411 corresponding to an interviewer to the interviewer multimedia conferencing client 402. The first interview information 411 comprises first interview multimedia information and resume information of a candidate. The interviewer multimedia conferencing client 402 displays a resume 412 indicated by the resume information when displaying the first interview multimedia information.

A candidate multimedia conferencing client 401 runs in the second terminal device corresponding to the candidate. The first link sent to the second device may be displayed in a corresponding web page such as a mailbox. After viewing the first link in the corresponding web page such as a mailbox, the candidate may perform a selection operation on the first link, such as clicking. The second terminal device may, after receiving the selection operation of the candidate, determine whether a multimedia conferencing client is locally installed or not. If yes, then the second terminal device directly invokes the pre-installed multimedia conferencing client. If the multimedia conferencing client is not installed in advance in the second terminal device, then the second terminal device may prompt the candidate to download and install a multimedia conferencing client. The candidate may install the multimedia conferencing client (i.e., the candidate multimedia conferencing client 401) in the second terminal device according to the prompt. After the candidate multimedia conferencing client 401 is installed, the second terminal device may send an interview request 414 to enter an interview to the multimedia conferencing server 403 according to a selection operation 413 performed by the user on the first link. The interview request may comprise user information. The multimedia conferencing server 403 connects the candidate multimedia conferencing client 401 to a predetermined web conference room according to the received interview request and determines a user identity 415 according to the user information. Here, the user identity determined according to the user information is a candidate. The multimedia conferencing server 403 may send second interview information 416 corresponding to the candidate to the candidate multimedia conferencing client 401. The second interview information 416 comprises second interview multimedia information. The candidate multimedia conferencing client 401 displays second interview multimedia information 417.

Figure 5:
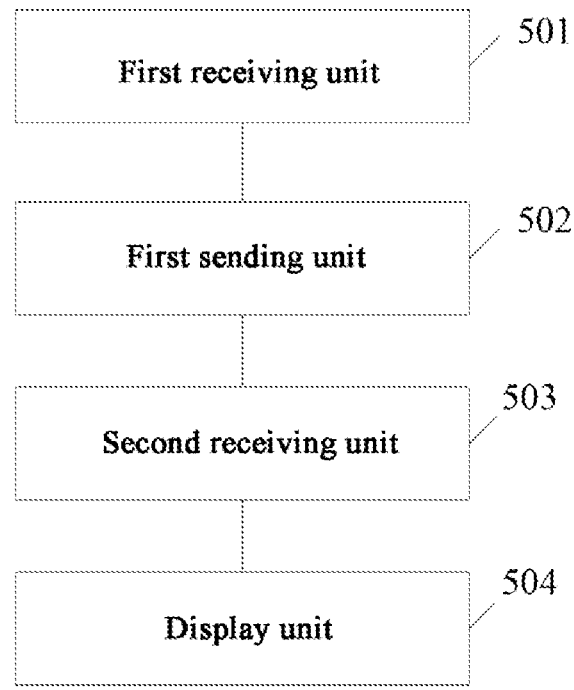
FIG. 5 is a structural schematic diagram of an embodiment of an information interaction apparatus according to the present disclosure.

Further with reference to FIG. 5, as the implementation of the methods shown in the above various methods, the present disclosure provides an embodiment of an information interaction apparatus, the apparatus embodiment corresponding to the method embodiment shown in FIG. 1. Specifically, the apparatus may be applied to a terminal device.

As shown in FIG. 5, the information interaction apparatus of this embodiment comprises: a first receiving unit 501, a first sending unit 502, a second receiving unit 503 and a display unit 504. Wherein the first receiving unit 501 is configured to receive an interview instruction issued by a user to enter an interview; the first sending unit 502 is configured to send an interview request generated according to the interview instruction to a multimedia conferencing server to instruct the multimedia conferencing server to connect the terminal device to a predetermined web conference room, and determine a user identity of the user according to user information indicated by the interview request; wherein the user identity comprises an interviewer or a candidate; the second receiving unit 503 is configured to, if the user identity of the user is determined to be an interviewer, receive first interview information that matches the interviewer identity as returned by the multimedia conferencing server, wherein the first interview information comprises resume information of a candidate; the display unit 504 is configured to display a resume indicated by the resume information in a multimedia conferencing client of the terminal device.

In this embodiment, the specific processing and technical effects of the first receiving unit 501, the first sending unit 502, the second receiving unit 503 and the display unit 504 of the information interaction apparatus may be referred to the relevant illustration of steps 101, 102, 103 and 104 of the corresponding embodiment shown in FIG. 1, which is not detailed here.

In some optional implementations, the information interaction apparatus further comprises a link display unit (not shown in the figure). The link display unit is configured to: before the first receiving unit 501 receives a preset interview instruction issued by a user to enter an interview, display a first link for entering the interview in the multimedia conferencing client, the first link comprising address information of the web conference room; the first receiving unit 501 is configured to: receive the interview instruction issued by the user by performing a selection operation on the first link, wherein the first link is determined in the following way: a recruitment application server sends a conference room reservation request to a multimedia conferencing server according to an interview appointment request received from a recruitment application client, the interview appointment request comprises interviewer information, interview time information and candidate information; a multimedia conferencing server determines a web conference room according to the conference room reservation request and generates the first link according to a preset rule and the information of the web conference room; the multimedia conferencing server sends the first link to the recruitment application server so that the recruitment application server sends the first link to the user.

In some optional implementations, the resume information of the candidate comprises a network storage address of a resume of the candidate, and the information interaction apparatus further comprises an obtaining unit (not shown in the figure). The obtaining unit is configured to, before the display unit 504 displays a resume indicated by the resume information in the multimedia conferencing client, obtain the resume based on the network storage address.

In some optional implementations, the display unit 504 is further used to: run in the multimedia conferencing client a preset application embedded in the multimedia conferencing client for displaying job applicant information; present a resume indicated by the resume information in a resume display window of the preset application.

In some optional implementations, the first interview information further comprises first interview multimedia information, and the display unit 504 is further used to: in response to receiving a switch instruction that instructs to switch to a second display window when a first display widow is being displayed in a multimedia conferencing client, switch the first display window to the second display window according to the switch instruction; wherein the first display window is a resume display window of the preset application for displaying resumes, and the second display window is a first multimedia stream display window for displaying the first interview multimedia information; or the first display window is the first multimedia stream display window, and the second display window is the resume display window.

In some optional implementations, the first interview information further comprises first interview multimedia information, and the display unit 504 is further used to: simultaneously display in the multimedia conferencing client a first multimedia stream display window for displaying the first interview multimedia information and a resume display window for displaying the resume.

In some optional implementations, the display unit 504 is further used to: display the first multimedia stream window and the resume display window in separate areas in a display interface of the multimedia conferencing client.

In some optional implementations, the size of the first multimedia stream display window is larger than that of the resume display window.

In some optional implementations, the size of the first multimedia stream display window and the size of the resume display window are adjusted based on a display size adjustment operation of the user.

In some optional implementations, the display unit 504 is further used to: in response to receiving an area switch operation on a display area of the resume display window and/or a display area of the first multimedia stream display window, switch the display area of the resume display window and/or the first multimedia stream display window according to the area switch operation.

In some optional implementations, the information interaction apparatus further comprises an authorization information receiving unit (not shown in the figure). The authorization information receiving unit is configured to, before the display unit 504 displays a resume indicated by the resume information in a multimedia conferencing client, receive authorization information sent by a recruitment application server to present the resume, wherein the authorization information is issued by the recruitment application server in response to a user identity of a user logging in through the preset application being an interviewer; and the display unit 504 is further used to: present the resume in a resume display window of the preset application.

In some optional implementations, the information interaction apparatus further comprises a first interview evaluation information input unit (not shown in the figure). The first interview evaluation information input unit is configured to: receive interview evaluation information input by the user to the resume display window; synchronize the interview evaluation information to a recruitment application server by using the preset application.

In some optional implementations, the information interaction apparatus further comprises a second interview evaluation input input unit (not shown in the figure). The second interview evaluation information input unit is configured to: receive a preset operation performed by the user on an interview evaluation control for instructing to write interview evaluation when finishing the interview, close the multimedia conferencing client and invoke a browser to open an address of the resume; display an interview evaluation information input window by using the browser; receive interview evaluation information inputted by the user to the evaluation information input window and send the interview evaluation information to a recruitment application server.

In some optional implementations, a display interface of a multimedia conferencing client of the interviewer comprises a preset permission control, the preset permission control matching permissions of the interviewer.

In some optional implementations, the second receiving unit 503 is further used to: if the user identity of the user is a candidate, receive second interview information returned by a multimedia conferencing server, the second interview information comprising second interview multimedia information; and the display unit 504 is further used to: display the second interview multimedia information in a multimedia conferencing client of the terminal device.

Figure 6:
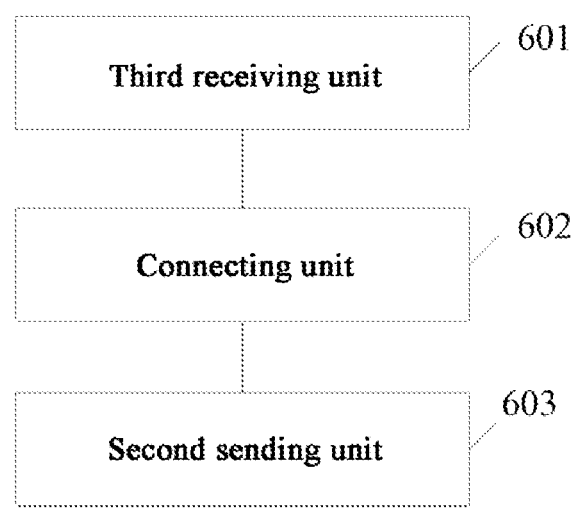
FIG. 6 is a structural schematic diagram of an embodiment of an information interaction apparatus according to the present disclosure.

Further with reference to FIG. 6, as the implementation of the methods shown in the above various methods, the present disclosure provides an embodiment of an information interaction apparatus, the apparatus embodiment corresponding to the method embodiment shown in FIG. 1. Specifically, the apparatus may be applied to a multimedia conferencing server.

As shown in FIG. 6, the information interaction apparatus of this embodiment comprises: a third receiving unit 601, a connecting unit 602 and a second sending unit 603. Wherein the third receiving unit 601 is configured to receive an interview request sent by a terminal device, the interview request comprising user information of a user sending the interview request, and information of a predetermined web conference room; the connecting unit 602 is configured to connect the terminal device to a web conference room indicated by the information of the web conference room and determine a user identity of the user according to the user information, the user identity comprising an interviewer or a candidate; the second sending unit 603 is configured to, if the user identity of the user is determined to be an interviewer, send first interview information corresponding to the interviewer to the terminal device, the first interview information comprising resume information of a candidate, to instruct the terminal device to display a resume indicated by the resume information when the first interview multimedia information is being displayed in a multimedia conferencing client.

In this embodiment, the specific processing and technical effects of the third receiving unit 601, the connecting unit 602 and the second sending unit 603 of the information interaction apparatus may be referred to the relevant illustration of steps 301, 302 and 303 in the corresponding embodiment of FIG. 3 respectively, which is not detailed here.

In some optional implementations of this embodiment, the second sending unit 603 is further used to: if the user identity of the user is determined to be a candidate, send second interview information corresponding to the candidate to the terminal device, to instruct the terminal device to display second interview multimedia information comprised in the second interview information in a multimedia conferencing client.

In some optional implementations, the third receiving unit 601 is further used to: receive an interview request issued by the terminal device according to a selection operation performed by a user on a displayed first link, wherein the first link comprises an address of the web conference room.

In some optional implementations, the information interaction apparatus further comprises a link sending unit (not shown in the figure). The link sending unit is configured to, before the third receiving unit 601 receives an interview request sent by a terminal device, the interview request comprising user information of a user sending the interview request and information of a predetermined web conference room: receive a conference room reservation request sent by a recruitment application server to a multimedia conferencing server according to an interview appointment request received from a recruitment application client, the interview appointment request comprising information of an interviewer, interview time information, and information of a candidate; determine a web conference room according to the conference room reservation request and generating the first link according to a preset rule and the information of the web conference room; send the first link to the recruitment application server so that the recruitment application server sends the first link to the user.

In some optional implementations, the second sending unit 603 is further used to: if the user identity of the user is determined to be an interviewer, obtain resume information of a candidate indicated by the interview request from a recruitment application server according to the interview request; send the first interview information to the terminal device.

Figure 7:
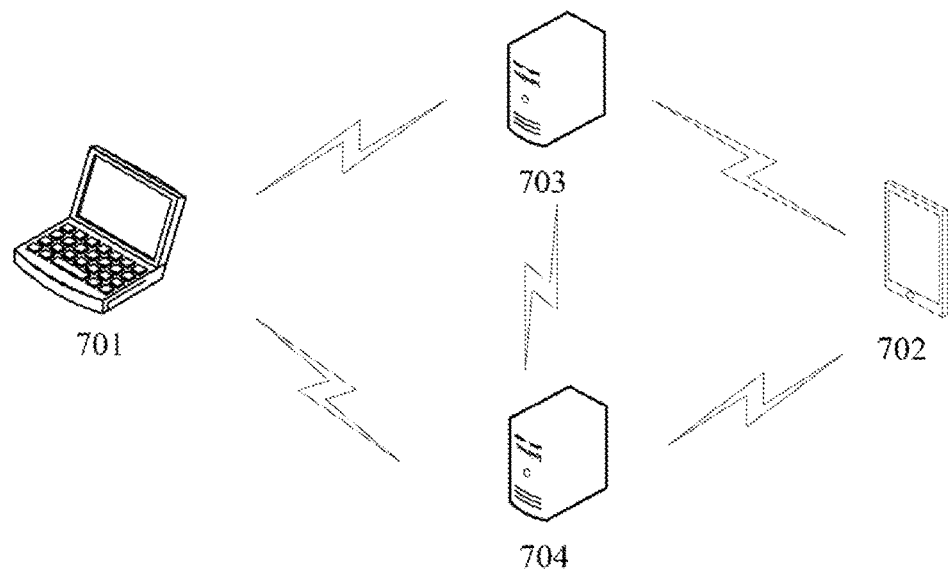
FIG. 7 is an exemplary system architecture in which an information interaction method of an embodiment of the present application may be applied.

With reference to FIG. 7, this figure shows an exemplary system architecture in which an information interaction method of an embodiment of the present disclosure may be applied.

As shown in FIG. 7, the system architecture may comprise a first client of an interviewer, a second client of a candidate, a recruitment application server 703 and a multimedia conferencing server 704. The first client may run in a first terminal device 701, and the second client may run in a second terminal device 702 of the candidate. The first client and the multimedia conferencing server 704, the second client and the multimedia conferencing server 704, the first client and the recruitment application server 703, the second client and the recruitment application server 703, the first client and the recruitment application server 703, the second client and the recruitment application server 703, and the recruitment application server 703 and the multimedia conferencing server 704 communicate with each other via a network. The network may comprise various connection types, such as wired, wireless communication link, optical cable, etc.

The first client and the second client may interact with the multimedia conferencing server 704 via a network to receive or send messages. Various client applications may be installed on the first client and the second client, such as a web page browser application, and a multimedia conferencing application. The client application in the first client and the second client may receive a user instruction and perform a corresponding function according to the user instruction, for example, obtain a multimedia conferencing data stream from the multimedia conferencing server according to the user instruction.

The first terminal device 701 and the second terminal device 702 may be hardware or software. When the first terminal device 701 and the second terminal device 702 are hardware, they may be various electronic devices having a display screen and supporting web browsing, which include but not limited to, a smart phone, a tablet computer, a laptop portable computer and a desktop computer, etc. When the first terminal device 701 and the second terminal device 702 are software, they may be installed in the above enumerated electronic devices, and may be implemented as multiple software or software modules (e.g., software or software modules for providing distributed services) and may also be implemented as a single software or software module, which is not limited here.

The multimedia conferencing server 704 may comprise multiple servers. The multimedia conferencing server 704 provides various services, such as receiving a multimedia information obtaining request sent by the first client and the second client, obtaining multimedia information corresponding to the multimedia information obtaining request in various ways according to the multimedia information obtaining request, and sending the multimedia information to the first client and the second client.

The recruitment application server 703 may comprise multiple servers. The recruitment application server 703 provides various services to reserve conference rooms with the multimedia conferencing server according to interview appointments for recruiters.

The recruitment application server 703 is configured to: according to a received interview appointment request, send a web conference room reservation request to the multimedia conferencing server, wherein the interview appointment request and the web conference room reservation request each comprise interviewer information, candidate information and interview time; receive web conference room information returned by the multimedia conferencing server according to the web conference room reservation request, generate a first link according to the web conference room information and send the first link to the interviewer and the candidate.

The multimedia conferencing server 704 is configured to: determine a web conference room according to the received conference room reservation request sent by the recruitment application server, and send the web conference room information to the recruitment application server; receive an interview request sent by the first client and the second client according to the first link, connect the first client and the second client to the web conference room, and determine a user identity of a user to be an interviewer or a candidate according to user information indicated by the interview request; send first interview information that matches the interviewer identity to the first client, the first interview information comprising first interview multimedia information and resume information of a candidate; and send second interview information to the second client, the second interview information comprising second interview multimedia information.

The first client is configured to: send an interview request to a multimedia conferencing server according to a first link, and receive first interview information that matches the interviewer identity as returned by the multimedia conferencing server; display a resume indicated by the resume information when the first interview multimedia information is being displayed in a multimedia conferencing client.

The second client is configured to: send an interview request to a multimedia conferencing server according to a first link, and receive second interview information that matches the candidate identity as returned by the multimedia conferencing server; display the second interview multimedia information in a multimedia conferencing client.

It is noteworthy that the information interaction method provided by the embodiments of the present disclosure may be performed by the first terminal device 701 or the second terminal device 702. Accordingly, the information interaction apparatus may be arranged in the first terminal device 701 or the second terminal device 702. In addition, the information interaction method provided by the embodiments of the present disclosure may further be performed by the multimedia conferencing server 705, and accordingly, the information interaction apparatus may be arranged in the multimedia conferencing server 705.

It should be understood that the respective number of the first terminal device, the second terminal device, the multimedia conferencing server and the recruitment application server in FIG. 7 is merely schematic. According to implementation needs, there may be any number of first terminal devices, second terminal devices, multimedia conferencing servers and recruitment application servers.

Figure 8:
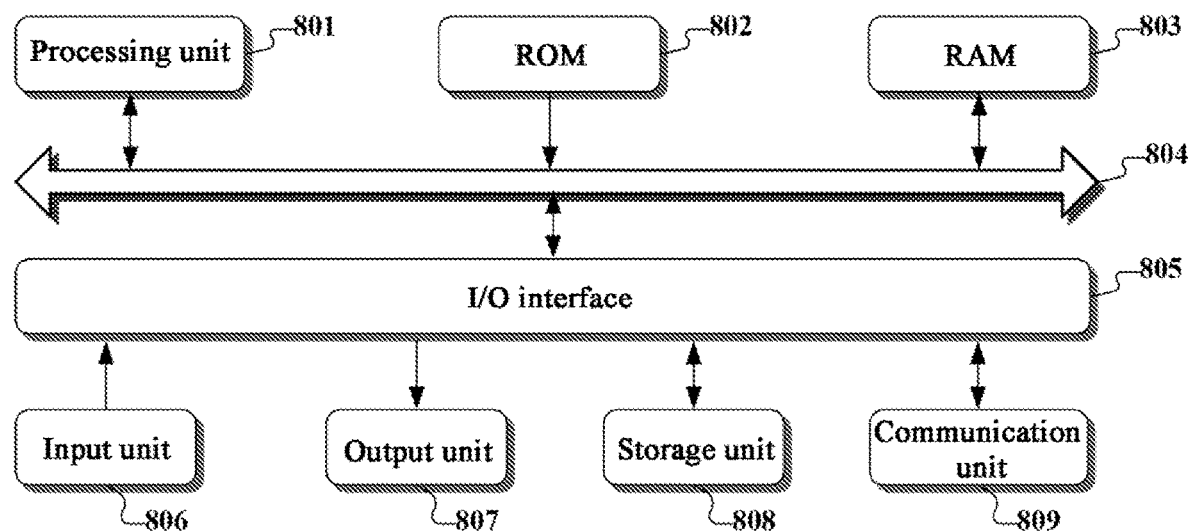
FIG. 8 is a schematic diagram of the basic structure of an electronic device provided by an embodiment of the present disclosure.

Reference is made to FIG. 8 below, which shows a structural schematic diagram of an electronic device (e.g., the terminal device or a server on the multimedia conferencing server end in FIG. 7) suitable for implementing the embodiments of the present disclosure. The terminal device in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 8 is merely an example and should not be construed to impose any limitations on the functionality and use scope of the embodiments of the present disclosure.

As shown in FIG. 8, the electronic device may comprise a processing unit (e.g., a central processor, a graphics processor) 801 which is capable of performing various appropriate actions and processes in accordance with programs stored in a read only memory (ROM) 802 or programs loaded from a storage unit 808 to a random access memory (RAM) 803. In the RAM 803, there are also stored various programs and data required by the electronic device 800 when operating. The processing unit 801, the ROM 802 and the RAM 803 are connected to one another via a bus 804. An input/output (I/O) interface 805 is also connected to the bus 804.

Usually, the following units may be connected to the I/O interface 805: an input unit 806 including a touch screen, a touch pad, a keyboard, a mouse, a camera, a microphone, an accelerometers, a gyroscope, or the like; an output unit 807, such as a liquid-crystal display (LCD), a loudspeaker, a vibrator, or the like; a storage unit 808, such as a magnetic tape, a hard disk or the like; and a communication unit 809. The communication unit 809 allows the electronic device to perform wireless or wired communication with other device to exchange data with other device. While FIG. 8 shows the electronic device with various units, it should be understood that it is not required to implement or have all of the illustrated units. Alternatively, more or less units may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication unit 809, or installed from the storage unit 808, or installed from the ROM 802. The computer program, when executed by the processing unit 801, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation, to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the client and the server may communicate using any network protocol that is currently known or will be developed in future, such as the hyper text transfer protocol (HTTP) and the like, and may be interconnected with digital data communication (e.g., communication network) in any form or medium. Examples of communication networks include local area networks (LANs), wide area networks (WANs), inter-networks (e.g., the Internet) and end-to-end networks (e.g., ad hoc end-to-end networks), as well as any networks that are currently known or will be developed in future.

The above computer readable medium may be included in the above-mentioned electronic device; and it may also exist alone without being assembled into the electronic device.

The computer readable medium carries one or more programs.

In some embodiments, the one or more programs, when executed by the electronic device, cause the electronic device to: receive an interview instruction issued by a user to enter an interview; send an interview request generated according to the interview instruction to a multimedia conferencing server to instruct the multimedia conferencing server to connect the terminal device to a predetermined web conference room, and determine a user identity of the user according to user information indicated by the interview request; wherein the user identity comprises an interviewer or a candidate; if the user identity of the user is determined to be an interviewer, receive first interview information that matches the interviewer identity as returned by the multimedia conferencing server, wherein the first interview information comprises resume information of a candidate; display a resume indicated by the resume information in a multimedia conferencing client of the terminal device.

In some embodiments, the one or more programs, when executed by the electronic device, cause the electronic device to: receive an interview request sent by a terminal device, the interview request comprising user information of a user sending the interview request, and identification information of a predetermined web conference room; connect the terminal device to a web conference room indicated by the identification information and determine a user identity of the user according to the user information; if the user identity of the user is determined to be an interviewer, send first interview information corresponding to the interviewer to the terminal device, the first interview information comprising resume information of a candidate, to instruct the terminal device to display a resume indicated by the resume information in a multimedia conferencing client.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the module per se.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, units or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

We claim:

1. An information interaction method, comprising:
    displaying a first link for entering an interview in a multimedia conferencing client, the first link comprising address information of a web conference room;
    receiving an interview instruction issued by a user to enter a preset interview by performing a selection operation on the first link, wherein the first link is determined by: a recruitment application server sending a conference room reservation request to a multimedia conferencing server according to an interview appointment request received from a recruitment application client, the interview appointment request comprising interviewer information, interview time information and candidate information; a multimedia conferencing server determining a web conference room according to the conference room reservation request and generating the first link according to a preset rule and the information of the web conference room; and the multimedia conferencing server sending the first link to the recruitment application server so that the recruitment application server sends the first link to the user;
    determining whether user information of the user matches with a pre-stored interviewer information;
    in response to the user information matching the pre-stored interviewer information, determining that a user identity of the user is an interviewer;
    in response to the user information not matching the pre-stored interviewer information, determining whether the user information of the user matches with a pre-stored candidate information;
    in response to the user information matching the pre-stored candidate information, determining that the user identity of the user is a candidate;
    in response to the user information not matching the pre-stored candidate information, returning an exception message to indicate that the user information is abnormal;
    sending an interview request generated according to the interview instruction to a multimedia conferencing server to instruct the multimedia conferencing server to connect a terminal device to a predetermined web conference room, and determining a user identity of the user according to user information indicated by the interview request, wherein the user identity comprises an interviewer or a candidate;
    in response to the user identity of the user being an interviewer, receiving first interview information that matches the interviewer identity as returned by the multimedia conferencing server, wherein the first interview information comprises resume information of a candidate, and wherein the multimedia conferencing server prevents from sending the first interview information to a terminal device whose user is a candidate;
    running in the multimedia conferencing client a preset application embedded in the multimedia conferencing client for displaying job applicant information;
    receiving authorization information sent by a recruitment application server to present the resume, wherein the authorization information is issued by the recruitment application server in response to a user identity of a user logging in through the preset application being an interviewer; and
    presenting the resume in a resume displaying window of the preset application according to the authorization information,
    and wherein the method further comprises:
        in response to determining that the user is a user who issued the interview instruction to enter the preset interview through a terminal device and the user identity of the user being determined to be a candidate, receiving second interview information of the preset interview from the terminal device through which the interview instruction was issued, wherein the second interview information comprises second interview multimedia information comprising at least one of an audio data stream or a video data stream; and
        displaying the second interview multimedia information in the multimedia conferencing client of the terminal device.

2. The method according to claim 1, wherein the resume information of the candidate comprises a network storage address of a resume of the candidate, and
    before the displaying the resume indicated by the resume information in the multimedia conferencing client of the terminal device, the method further comprises:
    obtaining the resume based on the network storage address.

3. The method according to claim 1, wherein the first interview information further comprises first interview multimedia information, and displaying a resume indicated by the resume information in the multimedia conferencing client of the terminal device comprises:
    in response to receiving a switch instruction that instructs to switch to a second display window when a first display window is being displayed in a multimedia conferencing client, switching the first display window to the second display window according to the switch instruction, wherein the first display window is a resume display window of a preset application for resumes, and the second display window is a first multimedia stream display window for displaying the first interview multimedia information; or the first display window is the first multimedia stream display window, and the second display window is the resume display window.

4. The method according to claim 1, wherein the first interview information further comprises first interview multimedia information, and displaying the resume indicated by the resume information in the multimedia conferencing client of the terminal device comprises:

simultaneously displaying in the multimedia conferencing client a first multimedia stream display window for displaying the first interview multimedia information and a resume display window for displaying the resume.

5. The method according to claim 4, wherein simultaneously displaying in the multimedia conferencing client the first multimedia stream display window for displaying the first interview multimedia information and the resume display window for displaying the resume comprises:

displaying the first multimedia stream display window above the resume display window.

6. The method according to claim 4, wherein simultaneously displaying in the multimedia conferencing client the first multimedia stream display window for displaying the first interview multimedia information and the resume display window for displaying the resume comprises:

displaying the first multimedia stream window and the resume display window in separate areas in a display interface of the multimedia conferencing client.

7. The method according to claim 6, wherein:

a size of the first multimedia stream display window is larger than that of the resume display window.

8. The method according to claim 6, wherein the size of the first multimedia stream display window and the size of the resume display window are adjusted based on a display size adjustment operation of the user.

9. The method according to claim 6, wherein the method further comprises:

in response to receiving an area switch operation on a display area of the resume display window and/or a display area of the first multimedia stream display window, switching the display area of the resume display window and/or the first multimedia stream display window according to the area switch operation.

10. The method according to claim 1, wherein the method further comprises:

receiving interview evaluation information input by the user to the resume display window; and synchronizing the interview evaluation information to a recruitment application server by using the preset application.

11. The method according to claim 1, wherein the method further comprises:

receiving a preset operation performed by the user on an interview evaluation control for instructing to write interview evaluation when finishing the interview, closing the multimedia conferencing client and invoking a browser to open an address of the resume;

displaying an interview evaluation information input window by using the browser; and receiving interview evaluation information inputted by the user to the evaluation information input window and sending the interview evaluation information to a recruitment application server.

12. The method according to claim 1, wherein a display interface of a multimedia conferencing client of the interviewer comprises a preset permission control, the preset permission control matching permissions of the interviewer.

13. An information interaction method, comprising:

receiving an interview request sent by a terminal device, the interview request comprising user information of a user sending the interview request, and information of a predetermined web conference room, and wherein the interview request is displayed in a first link for entering an interview in a multimedia conferencing client, and wherein the first link is determined by: a recruitment application server sending a conference room reservation request to a multimedia conferencing server according to an interview appointment request received from a recruitment application client, the interview appointment request comprising interviewer information, interview time information and candidate information; a multimedia conferencing server determining a web conference room according to the conference room reservation request and generating the first link according to a preset rule and the information of the web conference room; and the multimedia conferencing server sending the first link to the recruitment application server so that the recruitment application server sends the first link to the user;

connecting the terminal device to a web conference room indicated by the information of a web conference room and determining a user identity of the user according to the user information, the user identity comprising an interviewer or a candidate;

obtain a login account of a user for logging in to the multimedia conferencing client;

determine the login account as a login account of the user for logging into a recruitment application;

determine a user identity of the user corresponding to the login account based on the login account, comprising:

determining whether user information of the user matches with a pre-stored interviewer information;

in response to the user information matching the pre-stored interviewer information, determining that a user identity of the user is an interviewer;

in response to the user information not matching the pre-stored interviewer information, determining whether the user information of the user matches with a pre-stored candidate information;

in response to the user information matching the pre-stored candidate information, determining that the user identity of the user is a candidate;

in response to the user information not matching the pre-stored candidate information, returning an exception message to indicate that the user information is abnormal;

in response to the user identity of the user being determined to be an interviewer, sending an authorization information for presenting a resume of a candidate to the terminal device; and sending first interview information corresponding to the interviewer to the terminal device without sending the first interview information to a terminal device whose user is a candidate, the first interview information comprising resume information of a candidate, so as to instruct, based on the authorization information, the terminal device to display a resume indicated by the resume information in a multimedia conferencing client, and wherein the method further comprises:

in response to determining that the user is a user who issued the interview instruction to enter the preset interview through a terminal device and the user identity of the user being determined to be a candidate, sending second interview information of the preset interview only to the candidate, wherein the second interview information comprises second interview multimedia information comprising at least one of an audio data stream or a video data stream; and instruct the terminal device through which the interview instruction was issued to display the second interview multimedia information comprised in the second interview information in the multimedia conferencing client.

14. The method according to claim 13, wherein receiving the interview request sent by the terminal device comprises:

receiving an interview request issued by the terminal device according to a selection operation performed by a user on a displayed first link, wherein the first link comprises an address of the web conference room.

15. The method according to claim 14, wherein, before receiving the interview request sent by the terminal device, the method further comprises:

receiving a conference room reservation request sent by a recruitment application server to a multimedia conferencing server according to an interview appointment request received from a recruitment application client, the interview appointment request comprising information of an interviewer, interview time information, and information of a candidate;

determining a web conference room according to the conference room reservation request and generating the first link according to a preset rule and the information of the web conference room; and sending the first link to the recruitment application server so that the recruitment application server sends the first link to the user.

16. The method according to claim 13, wherein, in response to the user identity of the user being determined to be an interviewer, sending first interview information corresponding to the interviewer to the terminal device comprises:

in response to the user identity of the user being determined to be an interviewer, obtaining resume information of a candidate indicated by the interview request from a recruitment application server according to the interview request;

sending the first interview information to the terminal device.

17. The method according to claim 13, wherein the first interview information further comprises first interview multimedia information, and a first multimedia stream display window for displaying the first interview multimedia information and a resume display window for displaying the resume are simultaneously displayed in the multimedia conferencing client.

18. The method according to claim 17, wherein the first multimedia stream display window is displayed above the resume display window.

19. The method according to claim 13, wherein a display interface of the multimedia conferencing client of the interviewer comprises a preset permission control, the preset permission control matching permissions of the interviewer.

* * * * *